Patented Feb. 2, 1943

2,310,181

UNITED STATES PATENT OFFICE 2,310,181

AZO DYESTUFFS

Neil Mitchill Mackenzie, Bound Brook, N. J., assignor to American Cyanamid Company, New York, N. Y., a corporation of Maine No Drawing. Application June 7, 1941,
Serial No. 397,085

7 Claims. (Cl. 260—193)

This invention relates to azo dyes prepared from sulfonic acid and sulfonamide derivatives of acetoacetic amides and may be represented by the following formula:

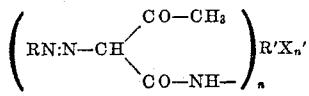

in which R is an aromatic radical, R' is a hydrocarbon radical of the benzene, aliphatic or alicyclic series, X is a radical included in the group consisting of $SO_3H$, $SO_2NH_2$ and their salts, and $n$ and $n'$ are integers in the group consisting of 1 and 2.

In the past azo dyes have been derived from sulfonic acid derivatives of acetoacetic arylides but a wider range of dyes and a much improved process of preparation is possible by the use of the intermediates employed in this invention, these intermediates being prepared by reacting diketene with amino sulfonic acids and amino sulfonamides.

In my copending application Serial No. 397,086 filed June 7, 1941, I have described compounds represented by the formula:

in which R is an aromatic, aralkyl, aliphatic or alicyclic radical, X is a radical included in the group consisting of $SO_3H$, $SO_2NH_2$ and their salts, $n$ is an integer included in the group consisting of 1 and 2, and $n'$ is an integer included in the group consisting of 1, 2, and 3.

According to the present invention these compounds are coupled with diazo compounds to give new and useful azo dyes.

Many coupling components are suitable to be used in producing the dyes of this invention and among the preferred ones are the products of the reaction of diketene with the following sulfonic acids: taurine, 1-amino-propane-2-sulfonic acid, 2-amino-2-methyl-propane sulfonic acid, aminocyclohexane sulfonic acids, benzylamine sulfonic acids, orthanilic acid, metanilic acid, sulfanilic acid, 4-amino-3-methyl-benzene sulfonic acid, and 2-amino-5-methyl-benzene sulfonic acid. Other suitable coupling components are reaction products of diamino sulfonic acids such as of phenylene diamine sulfonic acid and diamine disulfonic acids such as benzidine-2,2'-disulfonic acid. In addition mono amino disulfonic acids such as aniline 2,5-disulfonic acid may be reacted with diketene and the resulting products used for making the azo dyes of this invention. The coupling component may contain sulfamide groups instead of sulfonic acid groups and acetoacetyl sulfanilamide and acetoacetyl metanilamide may be combined with diazo compounds to give useful azo dyes.

Aromatic amines may be used as suitable diazo components. Examples of such are unsubstituted aromatic amines such as aniline and the naphthylamines and their homologues such as the toluidines and the xylidines and also substitution products containing groups such as nitro, sulfonic, hydroxyl, carboxylic, halogen, nitrile, sulfonamide and acylamino. Aromatic diamines are important and also tetrazo components such as benzidine 4,4'-diamino diphenylurea, 4,4'-diamino stilbene and their substitution products.

Some of the dyes of this invention which have a diazo component that has a metallizable group such as a hydroxyl, methoxyl, amino or carboxylic group in the position ortho to the amino group may be converted into valuable metal complexes, particularly the chromium or copper complexes. These dyes may also be used in the metachrome or the top chrome processes. No metallized dyes are specifically claimed in the present invention, but are claimed in the inventor's copending application Serial No. 397,084, filed June 7, 1941.

The dyes of this invention have various uses many of those having substantive groups being applicable as dyes for vegetable or animal fibers.

The shades of the dyes produced by this invention will vary according to the intermediates used and in the case of the metallized dyes with the metal compounds employed, although the shades of the dyes are mostly in the yellow or orange range.

The invention is illustrated but not limited by the following examples, in which the parts given are by weight.

Example 1

6.1 parts of dianisidine are tetrazotized in the usual manner with 13.2 parts of 38% hydrochloric acid, 40 parts of water and 8.7 parts of 40% sodium nitrite solution. This solution is then added to a solution of 14.1 parts of 4-acetoacetylaminobenzene sulfonic acid and 10 parts of sodium carbonate in 200 parts of water. The mixture is stirred during the addition and cooled with ice. The mixture is then stirred until the tetrazo has all reacted. After diluting to 600 cc. and heating to 60° C. the orange precipitate of dye is filtered off.

This new product dyes cotton bright yellowish orange shades.

The formula of this new dye in the free acid form is:

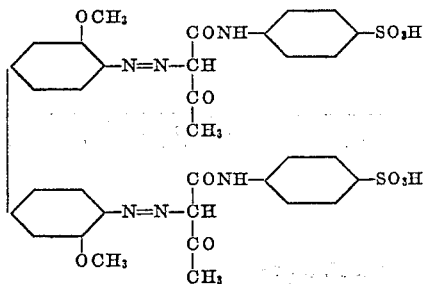

Example 2

A hot solution of 6.91 parts of p-nitraniline in 19.0 parts of 38% hydrochloric acid and 50 parts of water is cooled by the addition of 250 parts of ice and diazotized in the usual manner with 34.5 parts of 10% sodium nitrite solution. In a separate container 30.0 parts of crystalline sodium acetate are dissolved in 100 parts of a solution containing 14.1 parts of 3-acetoacetyl-aminobenzene sulfonic acid. The above diazo solution is added to this solution while the solution is stirred and cooled with ice. Coupling takes place rapidly and the dye separates as a yellow precipitate. On heating to the boil, the dye becomes crystalline (pale yellow needles). After cooling it is filtered off and dried. The formula of this new dye in the free acid form is:

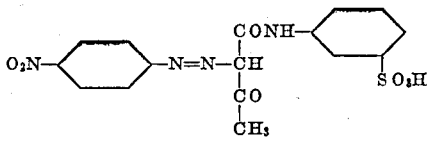

It dyes wool from an acid bath bright greenish yellow shades.

By the procedure outlined in this example p-nitraniline can be coupled with 1-acetoacetyl-aminoethane-2-sulfonic acid to give a yellow dye having in the free acid state the following formula:

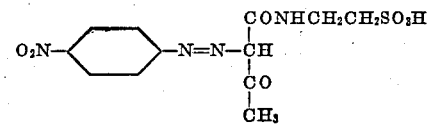

It dyes wool from an acid bath yellow shades.

Example 3

7.65 parts of 2-carboxy-4-aminphenol are dissolved in a solution of 2.0 parts of sodium hydroxide in 100 parts of water. This solution is acidified by the addition of 12.2 parts of 38% hydrochloric acid and is diazotized in the usual manner with a solution of 3.45 parts of sodium nitrite in 50 parts of water. Then in a separate vessel 10.0 parts of sodium carbonate are dissolved in a solution of 14.1 parts of 3-acetoacetyl-amino benzene sulfonic acid in 150 parts of water. The above diazo solution is then run in and stirred until the diazo has all reacted and the dye is precipitated in crystalline form (yellow needles). The dye is filtered off and dried. In the free acid form it has the following formula:

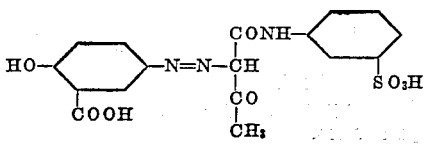

The new product dyes wool from an acid bath bright greenish yellow shades. When dyed on wool by the topchrome or metachrome method, it gives a bright reddish yellow shade of excellent fastness to washing and fulling.

Example 4

6.85 parts of anthranilic acid are dissolved in 7.25 parts of 38% hydrochloric acid and 100 parts of water. This solution is diazotized in the usual manner with 3.45 parts of sodium nitrite in 50 parts of water. This diazo solution is then added to a solution of 14.1 parts of 4-acetoacetylamino benzene sulfonic acid and 11.0 parts of sodium carbonate in 170 parts of water. During the addition the solution is cooled by adding ice. Coupling takes place rapidly and a yellow solution is formed. The dye is then precipitated by the addition of common salt, converted to the crystalline form (yellow plates) by heating to 70° C., cooled and filtered off. This new dye in the free acid form has the formula shown below:

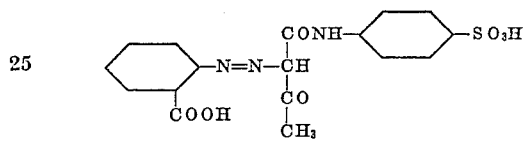

It dyes wool by the topchrome or metachrome process very greenish yellow shades of excellent fastness to light, washing and fulling.

Example 5

A finely divided suspension of 4.73 parts of 2-amino-4-sulfophenol in 50 parts of water and 5.29 parts of 38% hydrochloric acid is diazotized in the usual manner with a solution of 1.73 parts of sodium nitrite in 25 parts of water. In a separate vessel 5.0 parts of sodium carbonate are dissolved in a solution of 7.65 parts of 3-acetoacetylamino benzene sulfonic acid in 100 parts of water. The diazo solution prepared as described above is run in rapidly and the solution is stirred until coupling is complete. The dye is treated with salt at 100° C. and on cooling the dye separates as a crystalline precipitate (fine needles). It is filtered off and dried.

This new dye in the form of the free acid has the formula shown below:

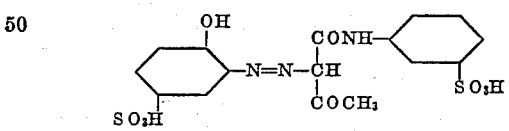

It dyes wool yellow shades which become redder on after-chroming.

By the procedure outlined in this example 2-amino-4-sulfophenol can be coupled with 4-acetoacetylamino benzene sulfonic acid and with 3-methyl-4-acetoacetylamino benzene sulfonic acid to produce new azo dyes.

Example 6

3.08 parts of 2-amino-4-nitrophenol are dissolved in 3.85 parts of 38% hydrochloric acid and 45 parts of water. This solution is then diazotized with a solution of 1.38 parts of sodium nitrite in 20 parts of water. At the same time, a solution is made by dissolving 7.41 parts of 1-acetoacetylaminobenzene-2,5-disulfonic acid and 6.00 parts of crystalline sodium acetate in 75 parts of water.

The above solution is run in rapidly and the mixture is then neutralized by adding a solution of 1.7 parts of sodium carbonate in 17 parts of water. It is then stirred until the diazo has completely reacted. The dye partially precipitates in crystalline form (yellow needles). After heating to 60° C. the dye is completely precipitated by the addition of common salt. The mixture is then cooled to 40° C. and the dye is filtered off. The new product in the free acid form has the following formula:

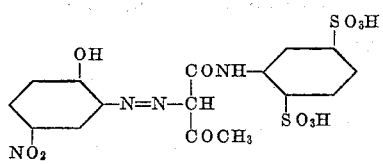

It dyes wool from an acid bath bright reddish yellow shades. When dyed by the topchrome or metachrome method, brownish yellow shades are obtained.

2-amino-4-nitrophenol can be coupled in a similar manner to 4-acetoacetylaminobenzene sulfonic acid and to 3-acetoacetylaminobenzene sulfonic acid.

*Example 7*

1.68 parts of 2-amino-4-methyl-6-nitrophenol and 0.69 part of sodium nitrite are dissolved in a solution of 0.41 part of sodium hydroxide in 30 parts of water. This solution is then added during stirring and cooling to 11.0 parts of 17% hydrochloric acid and the mixture is stirred until the diazotization is complete. The diazo solution is then added to a solution of 3.25 parts of 3-methyl-4-acetoacetylaminobenzene sulfonic acid and 5.0 parts of sodium carbonate in 60 parts of water. The solution is then stirred until the coupling is complete. The dye formed separates out in the form of a brown-red gelatinous precipitate. The slurry is then treated with common salt, heated to the boil and after cooling the precipitate of dye is filtered off. The structural formula of this new product in the free acid form is shown in the following formula:

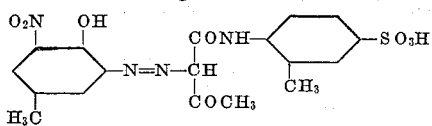

*Example 8*

2.25 parts of the hydrobromide of 2-amino-4-chlorophenol are dissolved in 25 parts of water and 1.06 parts of 38% hydrochloric acid. This solution is diazotized in the conventional manner with a solution of 0.69 part of sodium nitrite in 10 parts of water. This diazo solution is then added rapidly to a solution of 2.57 parts of 3-acetoacetylaminobenzene sulfonic acid and 1.5 parts of sodium carbonate in 25 parts of water. Coupling takes place rapidly and the dye is precipitated in crystalline form (reddish-yellow needles). The mixture is then heated to 90° C. and after cooling, the precipitate of dye is filtered off. Its chemical structure in the free acid state can be best represented by the following formula:

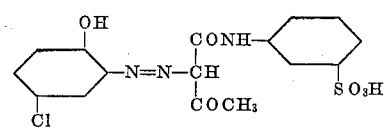

*Example 9*

4.68 parts of 2-amino-4-nitro-6-sulfophenol are dissolved in 20 parts of water and 5.15 parts of 38% hydrochloric acid solution. It is then diazotized in the usual manner by adding a solution of 1.38 parts of sodium nitrite in 20 parts of water. In another vessel 5.65 parts of 3-acetoacetylaminobenzene sulfonic acid and 10 parts of sodium acetate are dissolved in 100 parts of water. The above diazo solution is then run in very slowly. During the addition of the diazo solution 10% sodium carbonate solution is added as necessary to hold the pH at about 7. After all the diazo solution is added, the mixture is stirred until the coupling is complete. The dye is then almost entirely precipitated in a reddish-yellow form. The mixture is heated to 70° C. and the new dyestuff is precipitated with common salt. The crystalline precipitate (reddish-yellow needles) is then filtered off at 45° C. and dried. The formula of this new product in the free acid form is shown below:

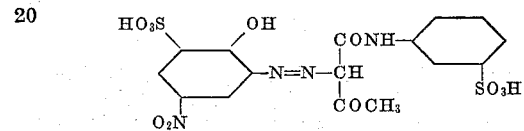

It dyes wool from an acid bath bright yellowish orange shades, which upon after-chroming become golden orange.

If an equivalent amount of 3-acetoacetylaminobenzene sulfonamide (5.63 parts) is substituted in the above example for 3-acetoacetylaminobenzene sulfonic acid, a similar dyestuff is obtained in the form of a reddish-yellow precipitate. It is isolated in the usual manner. The structure of this dyestuff in the free acid form is represented in the following formula:

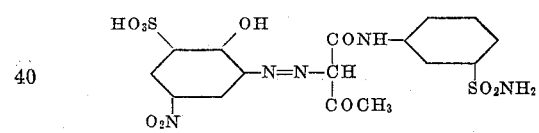

*Example 10*

5.00 parts of the diazo oxide of 1-amino-2-hydroxynaphthalene-4-sulfonic acid are added to a solution of 5.65 parts of 4-acetoacetylaminobenzene sulfonic acid and 4.0 parts of sodium carbonate in 75 parts of water. The mixture is stirred until all the diazo has reacted. The dye formed is partially precipitated from the solution. The mixture is then diluted with 125 parts of water, precipitated by the addition of common salt, and the crystalline precipitate (yellowish-red needles) formed is filtered off and dried. The new dye in the free acid form has the following formula:

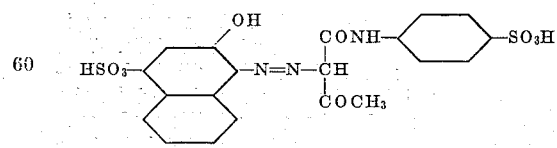

It dyes wool from an acid bath yellow shades.

1-amino-2-hydroxy naphthalene-4-sulfonic acid can be coupled with 3-acetoacetylaminobenzene sulfonic acid and 3-acetoacetylamino-4-chlorbenzene sulfonic acid, and dyes having similar properties are obtained.

*Example 11*

13.7 parts anthranilic acid are dissolved in 14.5 parts of 38% hydrochloric acid and 200 parts of water. This solution is diazotized in the known manner with 6.9 parts of sodium nitrite. This diazo solution is then added in the presence of ice to a solution of 25.6 parts of bis-4,4'-acetoacetyl-benzidine-2,2'-disulfonic acid and 20 parts of sodium carbonate in 700 parts of water. Coupling takes place rapidly and a granular yellow precipitate of dye is formed. It is filtered off and dried. This new dye, which in the form of the free acid is represented by the following formula:

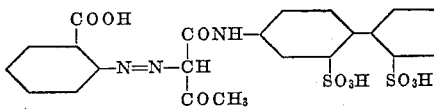

dyes wool from an acid bath yellow tints.

*Example 12*

3.08 parts of 2-amino-4-nitrophenol are dissolved in 3.85 parts of 38% hydrochloric acid and 45 parts of water. This solution is then diazotized in the usual manner with 1.38 parts of sodium nitrite. The diazo solution so obtained is then added to a solution of 4.88 parts of acetoacetyl-amino-methane sulfonic acid and 5.0 parts of sodium acetate in 100 parts of water. The mixture is neutralized by the addition of dilute sodium carbonate solution and then stirred at 40° C. until the coupling is complete. The new dyestuff, which separates in crystalline form (orange needles) is filtered off and dried. The new product, which in the form of the free acid has the following formula:

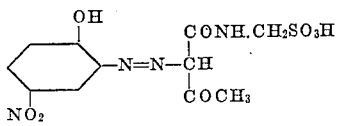

dyes wool from an acid bath reddish yellow shades. When dyed on wool by the topchrome or metachrome process, golden yellow shades having good fastness properties are obtained.

*Example 13*

A finely divided suspension of 4.73 parts of 2-amino-4-sulfophenol in 50 parts of water and 5.76 parts of 38% hydrochloric acid is diazotized in the known manner with 1.73 parts of sodium nitrite. The diazo solution obtained is added to a solution of 6.27 parts of acetoacetyl-amino-ethane sulfonic acid and 8.5 parts of sodium carbonate in 150 parts of water. The mixture is then stirred until the coupling is complete. The mixture is then neutralized with dilute hydrochloric acid and the dye is precipitated in the form of yellow needles by the addition of common salt. The dye is filtered off and dried. The new product which in the form of the free acid has the following formula:

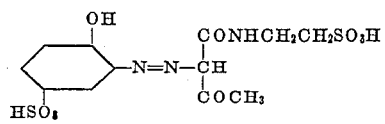

dyes wool yellow tints which become redder upon after treatment with chromium salts.

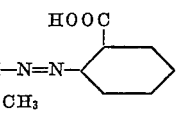

What I claim is:

1. As new products, azo dyes having the following formula:

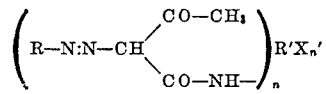

in which R is an aromatic radical, R' is a radical belonging to the group consisting of hydrocarbon radicals of the benzene, biphenyl, lower alkylene, aralkyl and alicyclic series, X is a radical included in the group consisting of SO₃H, and its salts, n is an integer included in the group consisting of 1 and 2, and n' is an integer included in the group consisting of 1, 2 and 3.

2. New products in accordance with claim 1 in which R' is phenylene.

3. New products in accordance with claim 1 in which R is a radical of the benzene series, having a hydroxyl or a carboxyl group ortho to the azo group.

4. New products in accordance with claim 1 in which R is a radical of the benzene series, having a hydroxyl group ortho to the azo group and being further substituted by at least one nitro group.

5. The compound having the following formula:

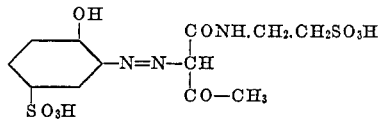

6. The compound having the formula:

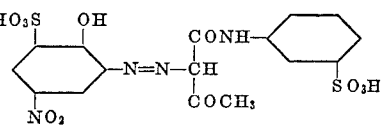

7. The compound having the formula:

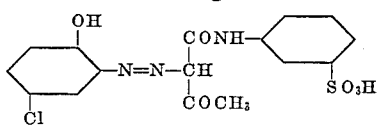

NEIL MITCHILL MACKENZIE.